Patented Apr. 3, 1923.

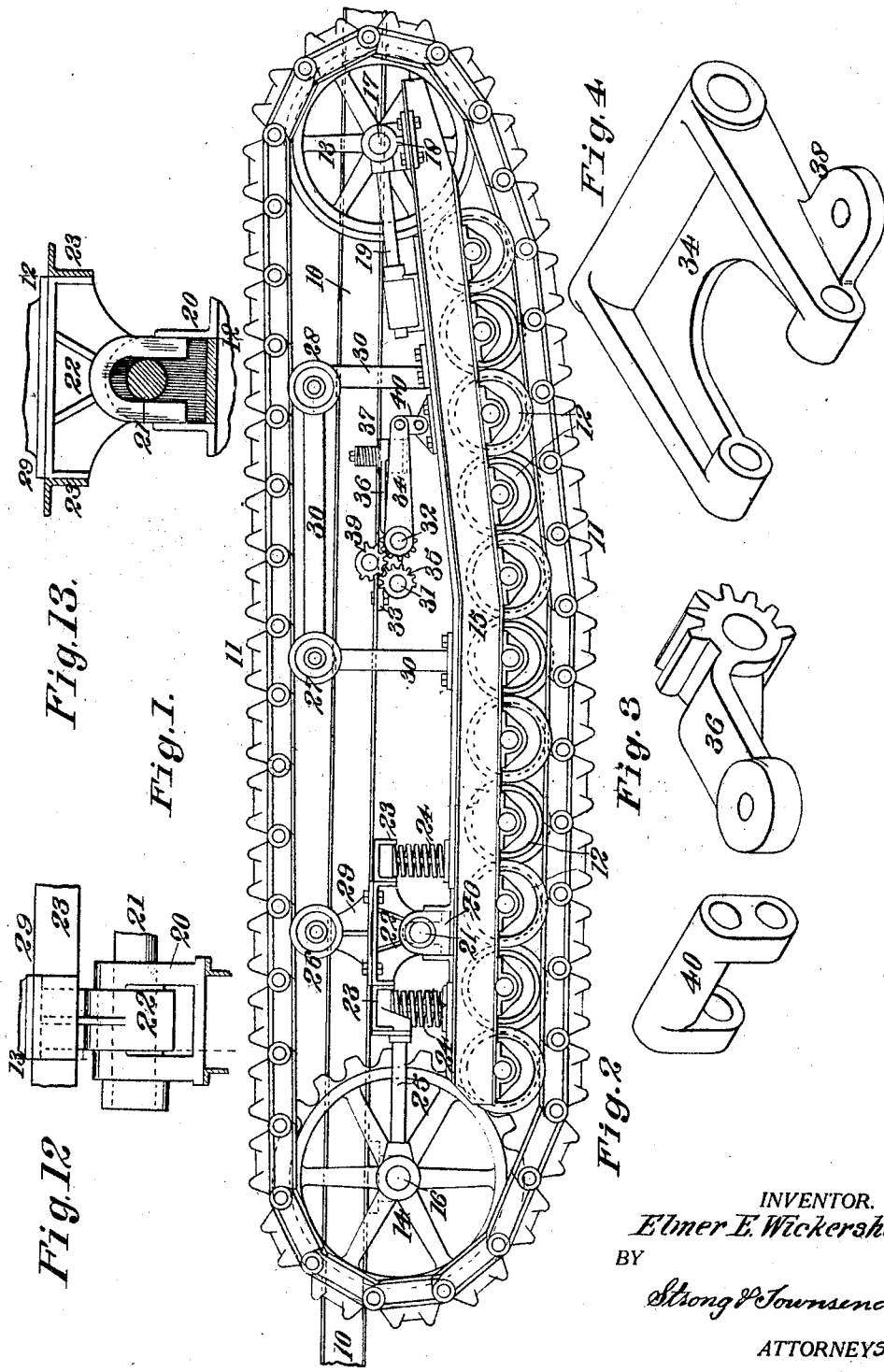

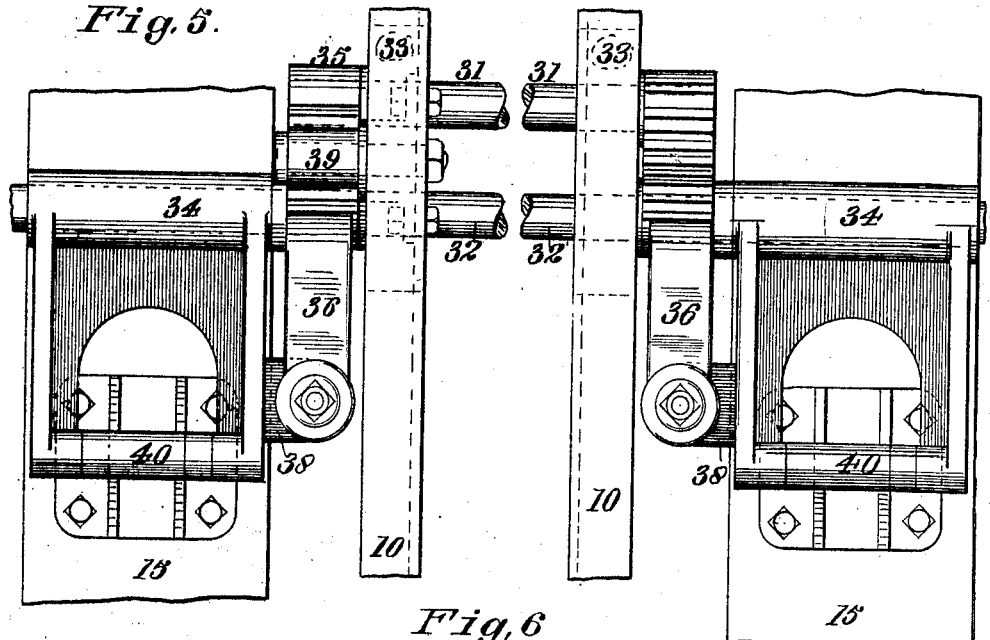

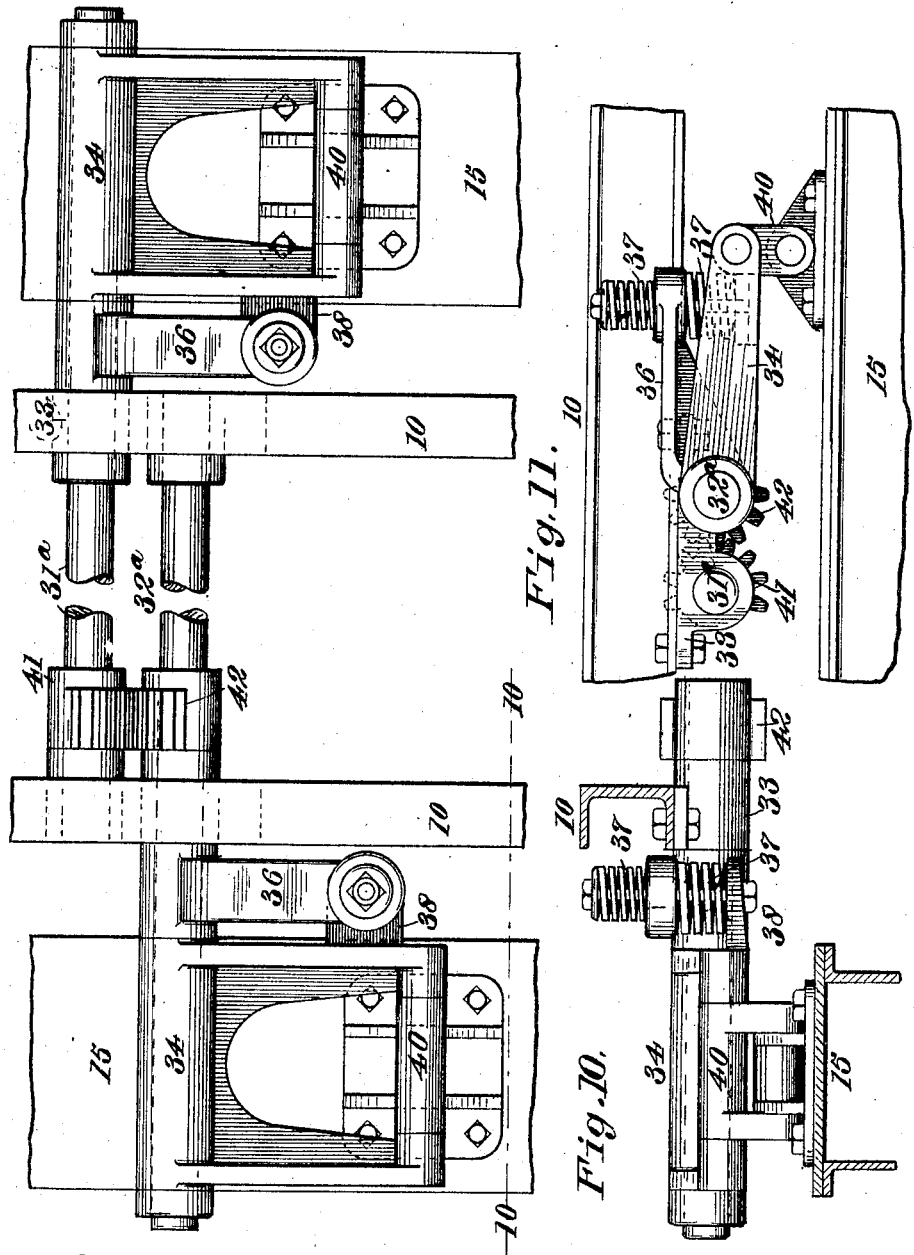

1,450,468

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR FRAME SUSPENSION.

Application filed August 15, 1918. Serial No. 249,963.

*To all whom it may concern:*

Be it known that I, ELMER E. WICKERSHAM, a citizen of the United States, residing at Stockton, in the county of San Joaquin and State of California, have invented new and useful Improvements in Tractor Frame Suspensions, of which the following is a specification.

This invention relates to a frame suspension for motor vehicles, and is particularly concerned with a tractor construction.

Due to the great weight of a tractor and the large dimensions of the self-laying tracks at the opposite sides thereof, it is desirable that the tractor frame be suspended in a manner to receive a minimum vibration of the track trucks and that the relative movement of these trucks may be effected without producing a similar relative movement of the tractor frame.

It is the principal object of this invention, therefore, to provide a flexible frame suspension for supporting a tractor upon independent track-laying trucks, and which structure will equalize the variation in the relative movement of the two trucks in a manner to prevent a considerable amount of this movement from being imparted to the vehicle body.

The present invention contemplates the use of a rigid frame, at the opposite sides of which are self-laying track units; each unit embodying a continuous rigid truck roller frame, resiliently supported in relation to the main frame at its rear end and yieldably supported by an equalizing mechanism at its forward end.

Referring to the drawings:

Fig. 1 is a view in side elevation, illustrating a truck unit, in connection with which a tractor main frame is suspended.

Fig. 2 is a view in perspective, illustrating a truck frame stabilizing link.

Fig. 3 is a view in perspective, illustrating one of the equalizing elements.

Fig. 4 is a view in perspective, illustrating the equalizer shackle.

Fig. 5 is a view in plan, illustrating the equalizer mechanism with parts broken away for the sake of convenience.

Fig. 6 is a view in elevation, disclosing the elements shown in Fig. 5.

Fig. 7 is a view in elevation, illustrating one end of the equalizer mechanism.

Fig. 8 is a view in elevation, disclosing the parts shown in Fig. 7 as viewed from the opposite sides.

Fig. 9 is another form of the equalizer mechanism.

Figs. 10 and 11 are views, showing details of the device as illustrated in Fig. 9.

Figs. 12 and 13 are views in side and front elevation disclosing the mounting of the transverse truck bars in relation to the main frame and the roller truck frames.

In the drawings, 10 indicates a tractor main frame, at the opposite sides of which are disposed self-laying track units. These units comprise a continuous articulated track 11, upon which the supporting rollers 12 travel. The track passes over idler wheels 13 at its forward end and driving sprockets 14 at its rear end. These are disposed at the opposite ends of roller truck frames 15. The sprockets 14 are carried upon a shaft 16 suitably journaled on the rear of the main frame. The wheels 13 are carried by a shaft 17 mounted in sliding bearings 18. These bearings are positioned upon the forward forked ends of the roller truck frames 15.

Adjusting rods 19 are provided for the forward bearings and afford them longitudinal adjustment in relation to the frame. The rear ends of the roller truck frames are provided with bearings 20 through which a transverse connecting rod 21 extends. This rod passes across beneath the main frame and through a similar bearing 20 in the opposite truck frame. The shaft 21 also extends through slotted hangers 22 fixed to the under face of the main frame. Thus it will be seen that the roller truck frames are afforded vertical and pivotal movement in relation to the main frame by the shaft 21.

Bolsters 23 are bolted to the bottom sides of the main frame and extend outwardly from the roller truck frames to receive the springs 24 which tend to resist the vertical and swinging movements of the frame. Hangers 22 are slotted at their lower ends and fit astride the shaft 21, and are further secured between the flanges on the bearing 20, thus it will be seen that the bolsters 23 are in alignment with springs 24 and properly support the hangers. A thrust rod 25 extends rearwardly from the bolsters and engages a bearing upon the outer ends of the shaft 16.

The upper run of the track chain is supported by rollers 26, 27 and 28. The roller 26 is rotatably supported upon a standard 29 fixed directly above the hanger 22. The other rollers are carried by the supporting structure 30 which is fixed near the forward end of the truck frame. Independent swinging action of the roller truck frames may take place around the shaft 21 as resisted by the springs 24. As it is probable that the truck frames will swing unequally in relation to each other, due to the variation in the road contour, it is desirable to provide equalizing means at the forward ends of the truck frames to allow relative movement of the truck units without moving the main frame from its horizontal position, if possible.

As shown in detail in Figs. 5 to 8, inclusive, this equalizing means consists of transverse shafts 31 and 32, which are rotatably supported in bearings 33 beneath the main frame of the tractor. These shafts are in spaced parallel relation to each other, and the shaft 32 is fitted loosely with shackles 34 at its opposite ends, said shackles extending in the same direction. The shaft 31 has fixed upon its opposite ends, segmental gears 35. Adjacent each shackle 34, on the inside thereof, and mounted loosely upon the shaft 32, is a radius arm 36 extending in the same direction as the shackle, and having its outer end connected thereto by means of upper and lower springs 37, the lower spring 37 resting upon a lug 38 formed integrally with the adjacent shackle. The inner end of each radius arm is formed with a segmental gear 36$^a$, one meshing with an idler pinion 39 mounted upon the adjacent side frame, said idler pinion 39 also meshing with the adjacent segmental gear 35. The other meshes directly with the segmental gear on shaft 31, as shown in Fig. 8. Each shackle arm is connected to the adjacent truck mechanism by means of a freely swinging link 40. Therefore when one truck frame rises at its forward end, the connected shackle acts to lift the adjacent radius arm, and the latter through the gears 39 and 35 causes the shaft 31 to rotate, which rotation imparts a downward movement to the opposite radius arm and connected shackle.

In the form of equalizing means shown in Figs. 9 to 11, inclusive, there are two parallel transversely extending shafts 31$^a$ and 32$^a$. The shaft 31$^a$ has a shackle 34 loosely fitted on one of its ends, while the shaft 32$^a$ has a similar shackle fitted loosely on its opposite end extending in the same direction as the first mentioned shackle. These shackles are connected to the adjacent truck mechanism by means of free swinging links 40. Radius arms 36 are fixed to each of the shafts 31$^a$ and 32$^a$, and are connected to the adjacent shackles by springs 37, similar to those used in the above described mechanism. The shafts 31$^a$ and 32$^a$ are connected together by means of segmental gears 41 and 42, which gives a reverse movement to the opposite shackles, as desired.

In the operation of the first described form of the mechanism, the truck frames may swing independently from their rear axis 21 and will be cushioned in their movement by the springs 24. As one frame swings upwardly it will act through the link 40 to swing the freely mounted shackle 34 around the shaft 32. As this shackle swings upwardly it will overcome the expansive action of the lower spring 37 and swing the radius arm 36 upwardly. The teeth of this arm will rotate the corresponding gear 39 in the direction indicated by the arrow $a$ in Fig. 7, and thus rotate the gear 35 and the shaft 31 in a reverse direction to that of the shaft 32. This will swing the corresponding radius rod upon the end of the shaft 31, upwardly and while completing the compressing of the upper spring 37 will draw the shackle 34 upwardly by means of the spring bolt therethrough.

This will substantially draw the main frame downwardly one half of the maximum difference in the level of the two truck frames and will act to maintain the vehicle main frame in horizontal alignment. It will be further noted that the shackle 34 and the stabilizing link 40 are of sufficient width to hold the forward end of the truck frames against lateral movement while allowing them to flexibly move vertically. The operation of the second form of the device will be evident from the foregoing explanation.

It will thus be seen that the frame suspension here provided will insure that the main frame may be supported in a substantially horizontal plane, while the separate trucks of the vehicle are allowed to move independently, and it will further be observed that a compensating suspension mechanism will be provided for the frame of a construction which will resiliently hold the main frame at all times and reduce its vibration to a minimum.

It will be noted that the main frame is cushioned at all points on the truck mechanisms, there being no rigid connection whereby shocks can be transmitted to the main frame. There is, moreover, a further equalizing feature due to the shape of the truck frames. The upwardly sloping member at the forward end carries rollers which are normally out of contact with the ground. Should the truck mechanism at one side strike a raise or obstruction in the roadway and move upwardly in consequence, the equalizing mechanism previously described will impart a downward thrust to the opposite truck mechanism at a point overlying the upturned portion of the truck frame. Since the frame is rigid and has a yielding connection at the rear, the tendency will be for the truck mechanism to rock slightly about a point coinciding with the angle formed where the upturned portion of the truck frame begins.

The practical effect will be that instead of the equalizing mechanism lifting the main frame and disturbing the normal level of the latter, the truck mechanism opposite to the rising one will dip downwardly. Without the upturned shape of the truck mechanism such an action could not occur on ordinary level roads.

Having thus described my invention, what I claim and desire to secure by Letters Patent is:

1. In a vehicle, a main frame, a chain track truck mechanism at each side thereof, rigid roller frames incorporated as a part of each of the truck mechanisms, said frames being inclined upwardly at their forward ends and having rollers journaled thereon normally out of contact with the ground, and a compensating connection between the forward ends of the roller frames and the main frame, whereby upward movement of one of the roller frames will impart a downward movement to the opposite truck frame.

2. In a vehicle, a main frame, a track laying truck mechanism at each side thereof, and means for supporting one end of the main frame upon the truck mechanisms in a manner to equalize the weight thereof, said means comprising a torsional member extending transversely of the main frame, a crank arm connected with each truck mechanism and gearing between each crank arm and the torsional member whereby an upward movement of one truck mechanism will impart a downward pressure upon the opposite truck mechanism.

3. Equalizing suspension means for vehicles of the self-laying track type comprising a torsional member extending transversely of the vehicle frame, a crank arm operatively connected with each truck mechanism, gearing between each crank arm and the said torsional member for translating an upward movement of one arm into a downward movement of the opposite arm, and resilient means included in the connections between each crank arm and the torsional member.

4. In a vehicle, a main frame, a track laying truck mechanism at each side thereof, and means for supporting one end of the main frame equally upon the truck mechanisms comprising a shaft extending transversely of the main frame and rotatable thereon, a crank arm connected to each truck mechanism and gearing between each crank arm and the said shaft for causing opposite movements of the crank arms.

5. In a tractor frame suspension, a main frame, oppositely disposed roller frames at the sides thereof, a transverse shaft rotatably secured beneath the main frame, gears fixed to the opposite ends of said shaft, and connecting means between the gears and the opposite roller frames of the tractor, whereby movement of one roller frame will tend to produce an equal opposite movement of the other roller frame.

6. Equalizing means for suspending the weight of a main frame upon a pair of roller truck frames of the self-laying track type comprising a transverse shaft rotatably secured to the main frame, gears fixed to opposite ends of said shaft, a crank arm connected to each roller frame, and connecting means between the gears and crank arms whereby movement of one roller frame will tend to produce an opposite movement of the other roller frame.

7. Equalizing means for suspending the weight of a main frame upon a pair of roller truck frames of the self-laying track type comprising a transverse shaft rotatably secured to the main frame, gears fixed to opposite ends of said shaft, a crank arm connected to each roller frame, connecting means between the gears and crank arms whereby movement of one roller frame will tend to produce an opposite movement of the other roller frame, and resilient means interposed in said last-named connections for absorbing minor vibrations of the roller frames.

In testimony whereof I have hereunto set my hand in the presence of two subscribing witnesses.

ELMER E. WICKERSHAM.

Witnesses:
JOHN H. HERRING,
W. W. HEALEY.